United States Patent
Andersson et al.

(10) Patent No.: US 6,257,649 B1
(45) Date of Patent: Jul. 10, 2001

(54) CONVERTIBLE TOP FOR A MOTOR VEHICLE, ESPECIALLY A PASSENGER VEHICLE

(75) Inventors: Kaj Andersson, Mellerud (SE); Ralf Valett, Stapelfeld (DE)

(73) Assignee: CTS-Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 09/423,444

(22) PCT Filed: Feb. 22, 1999

(86) PCT No.: PCT/EP99/01138

§ 371 Date: Nov. 9, 1999

§ 102(e) Date: Nov. 9, 1999

(87) PCT Pub. No.: WO99/46137

PCT Pub. Date: Sep. 16, 1999

(30) Foreign Application Priority Data

Mar. 9, 1998 (DE) ............... 198 10 022

(51) Int. Cl.⁷ .................................................. B60J 7/00
(52) U.S. Cl. ............... 296/107.09; 296/107.12; 296/117; 296/121
(58) Field of Search ............... 296/107.12, 117, 296/107.09, 121

(56) References Cited

U.S. PATENT DOCUMENTS

| | | | |
|---|---|---|---|
| 2,970,007 | * 1/1961 | Hennessy | 296/117 |
| 4,778,215 | * 10/1988 | Ramaciotti | 296/107.09 |
| 4,819,983 | * 4/1989 | Alexander et al. | 296/121 |
| 5,004,291 | * 4/1991 | Bauer et al. | 296/121 |
| 5,042,869 | * 8/1991 | Brin | 296/121 |
| 5,064,241 | * 11/1991 | Ohrle | 296/121 |
| 5,067,768 | * 11/1991 | Fischbach | 296/117 |
| 5,186,516 | * 2/1993 | Alexander et al. | 296/121 |
| 5,251,952 | 10/1993 | Guckel et al. . | |
| 5,284,378 | * 2/1994 | Sautter | 296/121 |
| 5,620,226 | * 4/1997 | Sautter | 296/107.09 |
| 5,779,299 | * 7/1998 | Purcell et al. | 296/121 |
| 5,839,778 | * 11/1998 | Schaible et al. | 296/121 |
| 5,904,394 | * 5/1999 | Dilluvio et al. | 296/121 |

FOREIGN PATENT DOCUMENTS

| | | | |
|---|---|---|---|
| 3724531 | * 12/1988 | (DE) | 296/117 |
| 41 23 774 | * 7/1993 | (DE) | 296/117 |
| 4307158C1 | 4/1994 | (DE) . | |
| 4327729C2 | 2/1998 | (DE) . | |
| 19642154A1 | 4/1998 | (DE) . | |
| 19706397C1 | 6/1998 | (DE) . | |
| 0 246 201 | * 11/1987 | (EP) | 296/107.09 |
| 20584 029 | * 1/1987 | (FR) | 296/107.09 |
| 06 135 234 | * 5/1994 | (JP) | 296/107.09 |

OTHER PUBLICATIONS

International Search Report, Jun. 4, 1999.
German Patent Office Action, Oct. 28, 1998.

\* cited by examiner

Primary Examiner—Joseph D. Pape
Assistant Examiner—Kiran B. Patel
(74) Attorney, Agent, or Firm—Crowell & Moring, L.L.P.

(57) ABSTRACT

A soft top for a vehicle, in particular a passenger vehicle, comprises a soft-top linkage which is pivotably mounted on soft-top supports on the body, the soft top being movable, by means of an actuating device, forwards from a rear storage position into a locking position situated above the windscreen frame. In order to provide a soft top in which, during the closing process, sufficient spring deflection is available, on the one hand, and, on the other hand, the forces for closing are kept low, provision is made that, during the closing process, the soft top is stopped, by the actuating device, in a premounted position above the locking position and is supported in this position by at least one spring-loaded stop.

41 Claims, 5 Drawing Sheets

CONVERTIBLE TOP FOR A MOTOR VEHICLE, ESPECIALLY A PASSENGER VEHICLE

BACKGROUND AND SUMMARY OF THE INVENTION

This application claims the priority of German application 198 10 022, filed in Germany on Mar. 9, 1998, and PCT EP99/01138 filed in the European Patent Office on Feb. 22, 1999, the disclosures of which are expressly incorporated by reference herein.

The invention relates to a soft top for a vehicle, in particular a passenger vehicle, having a soft-top linkage which is mounted pivotably on soft-top supports on the body, the soft top being movable, by means of an actuating device, forwards from a rear storage position into a locking position lying above the windscreen frame.

Soft tops of the generic type mentioned at the beginning (for example DE 43 27 729 C2) are moved during the closing process by means of the actuating device from the rear storage position into a locking position situated above the windscreen frame. During the movement of the soft top from the storage position into the locking position, the entire center of gravity of the system is displaced relative to the main pivot, which has the consequence that the torque in the main support, which results from the weight, changes. Close to the closed position, the torque of the soft top acts in a closing manner. Since the drive of the actuating device stops abruptly in the locking position, there is a deflection of the roof front end, which may result in a collision with the windscreen frame and therefore in the formation of noise and in damage. In order to prevent this, sufficient spring deflection has to be made available. Although there is spring deflection in the case of a kinematic configuration with a locking position of the roof front end sufficiently far above the windscreen frame, very great effort is expended when closing and locking the roof front end.

The object of the invention is to develop a soft top of the generic type mentioned at the beginning in such a manner that sufficient spring deflection is made available, on the one hand, and, on the other hand, the closing force is kept low.

According to the invention, this object is achieved by providing a soft top of the type referred to above, wherein the soft top is stopped during the closing process by the actuating device, in a premounted position above the locking position and is supported in this position by at least one spring-loaded stop which is arranged on the soft-top support or on the body adjacent to the soft-top support.

Advantageous features of preferred embodiments of the invention include:

i The provision of a spring loaded stop on each longitudinal side of the soft top;

ii The provision of extending each spring loaded stop in a longitudinal direction of the vehicle with a rear free end of each stop being operatively connected to the soft top linkage;

iii The provision that each stop comprises an outer guide part, an internal displaceable slide, and a disc spring assembly;

iv The provision that the outer guide part is connected in an adjustable manner to a receiving knot provided on the soft top support;

v The provision that the displaceable slide is connected to the outer guide part via a screw at its end which faces the soft-top frame;

vi The provision that the disc spring assembly is seated coaxially on the internal slide and is supported in a pre-stressed manner against the shoulder of the guide part at one end and at the other end against a collar on the end of the slide;

vii The provision that each spring loaded stop interacts with a main pillar of the soft top frame or with a mounting part placed upon the soft top frame and belonging to the main pillar;

viii The provision that the soft top is supported in the premounted position by the at least one spring loaded stop and that then a rear fabric-retaining hoop of the soft top is pivoted downwards and is locked to the soft top compartment lid line beneath it, subsequently the roof front end of the soft top being pressed down with a disc-spring assembly being compressed, from the premounted position into the lower line locking position;

ix The provision that the drive of the actuating device is stopped once the spring-loaded stop is reached; and x The provision that the drive is set in motion for a certain timing element after the fabric-retaining hoop is locked.

The advantages primarily achieved by the invention are to be seen in the fact that, during the closing process, the soft top is stopped in a premounted position situated above the locking position and is supported in this position by the stop, and in that a balance is therefore set between the closing torque, which results from the weight of the system, and the torque acting against it, which results from the spring resistance of the spring-loaded stop. Once the system is at rest, the drive moves, by its residual travel, counter to the spring deflection of the stop. The position then reached (locking position) makes simple locking of the soft top with little expenditure of force possible. Since the accelerations during the movement of the drive counter to the spring resistance of the stop are small, further deflection can be disregarded.

An exemplary embodiment of the invention is represented in the drawings and is described in more detail in the following.

DETAILED DESCRIPTION OF THE DRAWINGS

Figure 1:
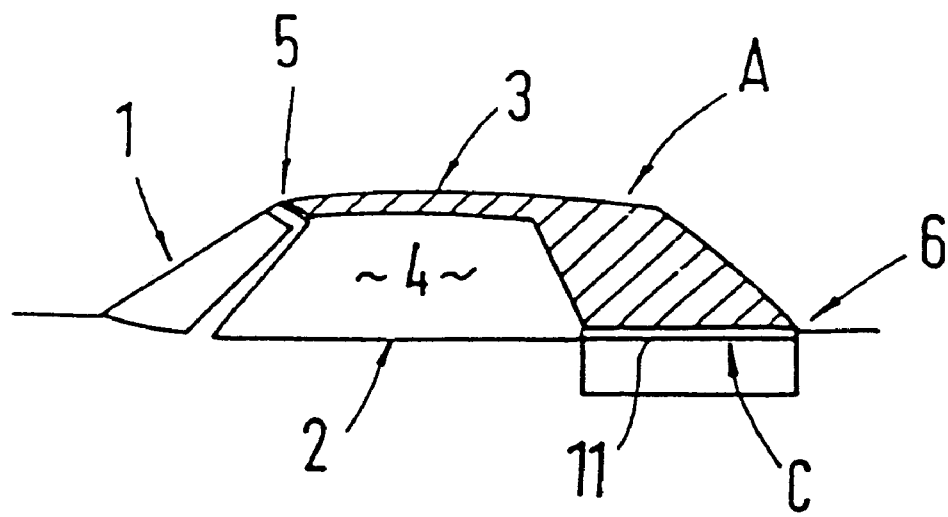
FIG. 1 shows a partial side view of a passenger vehicle with a soft top in the closed position.
Figure 2:
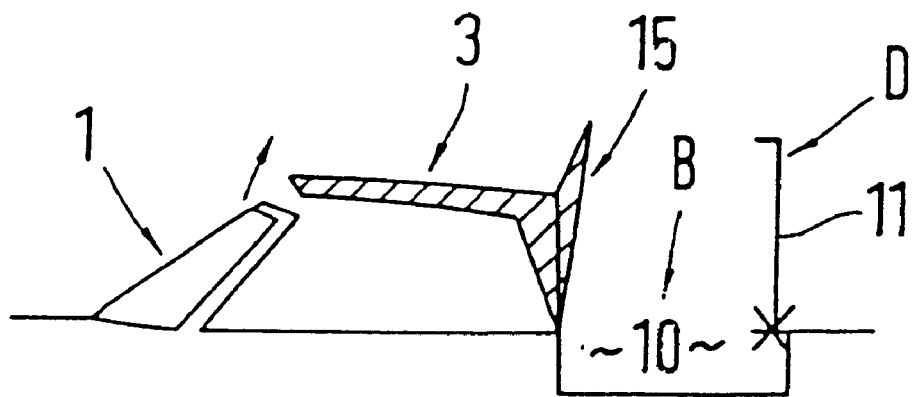
FIG. 2 shows a partial side view of a passenger vehicle in the premounted position before the locking position, with the fabric-retaining hoop swung up and with the soft-top compartment lid open.

The partial region, which is represented in FIG. 1, of a vehicle 1 comprising a passenger vehicle has a soft top 3 which in its closed position A extends above a belt line 2 between a windscreen frame 5 and a rear region 6 covering a passenger compartment 4.

The soft top 3, which is formed in the exemplary embodiment by a folding soft top, is kept in the closed position A on the windscreen frame 5 in a releasable manner via at least one locking device (not shown in more detail). The soft top 3 is composed of a soft-top linkage 7 and an elastic soft top cloth 8 which is supported by the latter. The soft-top linkage 7 is mounted pivotably on both longitudinal sides of the vehicle on soft-top supports 9 which are attached to the body.

In the folded-back storage position B, the soft top 3 is accommodated in a rear receiving space 10, which is formed in the exemplary embodiment by a soft-top compartment. This compartment can be upwardly closed by a soft-top compartment lid 11 which is coupled, at its rear edge region, in a rotatable manner to the adjacent body and can be moved from a closed position C into an upright position D and vice versa.

The soft-top linkage 7 comprises a large, front soft-top region (roof front end 12) which is arranged adjacent to the windscreen frame 5 and, seen in plan view, is of U-shaped design or approximately rectangular design and is formed by a die-cast part made of a light metal alloy.

The front soft-top region is connected on both longitudinal sides, in each case via one or more struts, to a main pillar 13, which is coupled rotatably to the soft-top support 9. The soft-top linkage 7 furthermore comprises an angled bow 14 and a rear fabric-retaining hoop 15, which in the closed position A of the soft top 3 rests on the soft top compartment lid 11 lying beneath it and is connected to the latter via at least one releasable lock (not shown in more detail). The soft top 3 can be moved, by means of an actuating device 16, forwards from the rear storage position B into a locking position E situated above the windscreen frame 5, and vice versa.

According to the invention, provision is made that, during the closing process, the soft top 3 is stopped, by the actuating device 16, in a premounted position F above the locking position E and is supported in this position F by at least one spring-loaded stop 17. In the exemplary embodiment, the premounted position F is situated approximately 25±10 mm higher than the locking position E. A spring-loaded stop 17 is preferably provided on each of the two longitudinal sides of the soft top 3.

Figure 4:
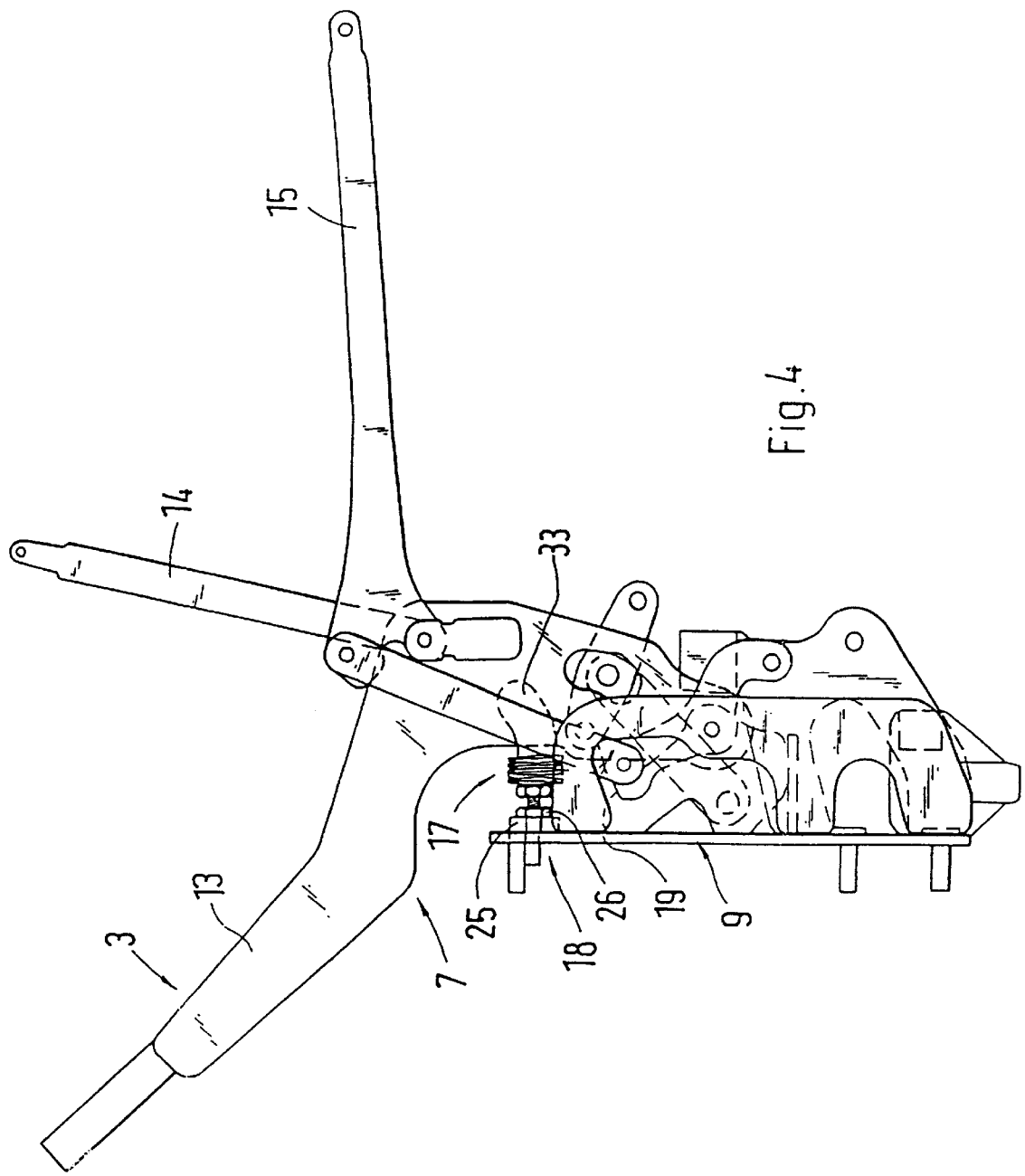
FIG. 4 shows a partial side view of the soft-top support on the body and adjacent components of the soft-top linkage and also the spring-loaded stop which is provided on the soft-top support.

According to FIG. 4 each spring-loaded stop 17 is provided on the soft-top support 9, to be precise in an upper region 18 of a transversely extending wall section 19 of the soft-top support 9. However, the stop 17 could also be attached adjacent to the soft-top support 9 directly on the adjacent body. Each spring-loaded stop 17 is aligned approximately horizontally and extends in the longitudinal direction of the vehicle, a rear free end 20 of each stop 17 temporarily being operatively connected to the soft-top linkage 7 during the closing process of the soft top 3. Each stop 17 is composed of an outer guide part 21, an internal, axially displaceable slide 22 and a disc-spring assembly 23 formed from a plurality of disc springs.

Figure 5:
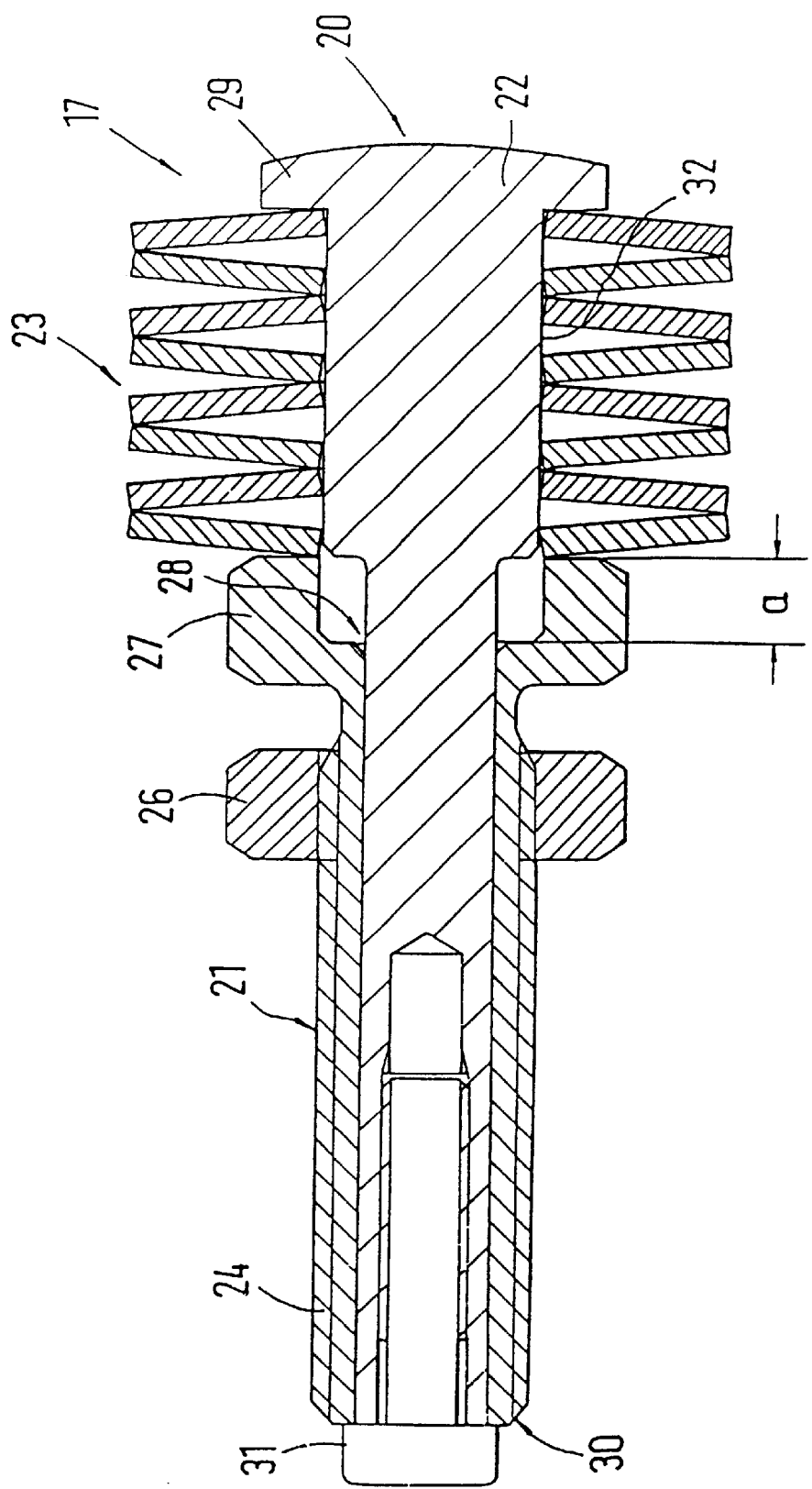
FIG. 5 shows the spring-loaded stop according to FIG. 4 in an enlarged representation, the stop being shown in a non-compressed position.

According to FIGS. 4 and 5, the elongated, hollow and cylindrical guide part 21 has an outer thread 24 which can be screwed into a receiving nut 25 attached on the soft-top support 9. The guide part 21 can be adjusted in the longitudinal direction and secured in the correct position by means of a lock nut 26. On the rear edge of the guide part 21, adjacent to the external thread 24, a radially protruding shoulder 27 having a substantially larger outside diameter is provided. The displaceable slide 22 is accommodated in a central hole 28 in the guide part 21. The slide 22, at the end which faces the soft-top frame 7, has a collar 29 on its end, which is provided with a spherical form on the side which faces the soft-top frame 7. The other end 30 of the slide is connected to the outer guide part 21 via a screw 31. The screw 31 is screwed into an internal threaded section of the slide 22 and is supported with its head against the end side of the slide 22 and the guide part 21.

The disc-spring assembly 23, which directly adjoins the collar 29 on the end, is placed onto a reduced, cylindrical section 32 of the slide 22. The disc-spring assembly 23 is supported at one end against the outside of the shoulder 27 of the guide part 21 and at the other end against the inside of the collar 29 on the end, and keeps the two parts in a prestressed state with respect to each other.

FIG. 5 shows the non-compressed position of the disc-spring assembly 23. Each spring-loaded stop 17 either interacts directly with a main pillar 13 of the soft-top linkage 7 or with a protruding mounting part 33 placed upon it and belonging to the main pillar 13.

Figure 6:
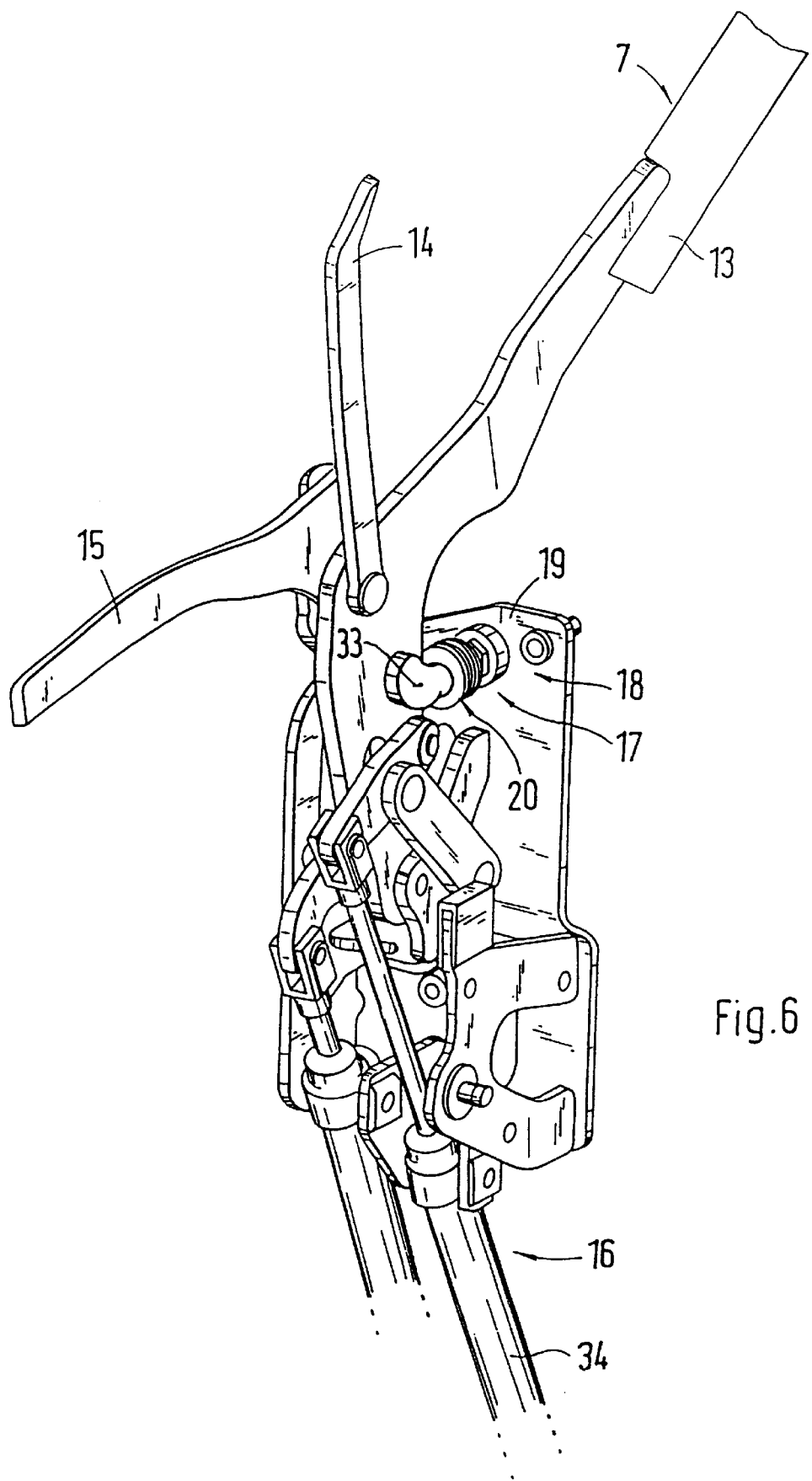
FIG. 6 shows a perspective representation of the soft-top support, the spring-loaded stop, the soft-top linkage and parts of the actuating device.

FIGS. 4 and 6 show the mounting part 33 which, on its end which faces the stop 17, has a rounded profile. Once the spring-loaded stop 17 is reached, the drive of the soft top 3 is stopped by the actuating device 16.

In the exemplary embodiment this is achieved by an internal switch (not shown in more detail) stopping the extension movement of a first hydraulic cylinder 34 of the drive. After the fabric-retaining hoop is locked, the drive is set in motion for a certain time by a timing element as described in the following. The rear fabric-retaining hoop 15 of the soft top 3 is then pivoted downwards and locked to the soft-top compartment lid 11 lying beneath it. The drive hydraulics for the soft top 3 are subsequently automatically actuated again by a timing element and the roof front end is pressed down, by the disc-spring assembly 23 being compressed, from the premounted position F into the lower-lying locking position E. The roof front end is subsequently locked by hand or using a motor and after that assumes the closed position G.

Figure 3:
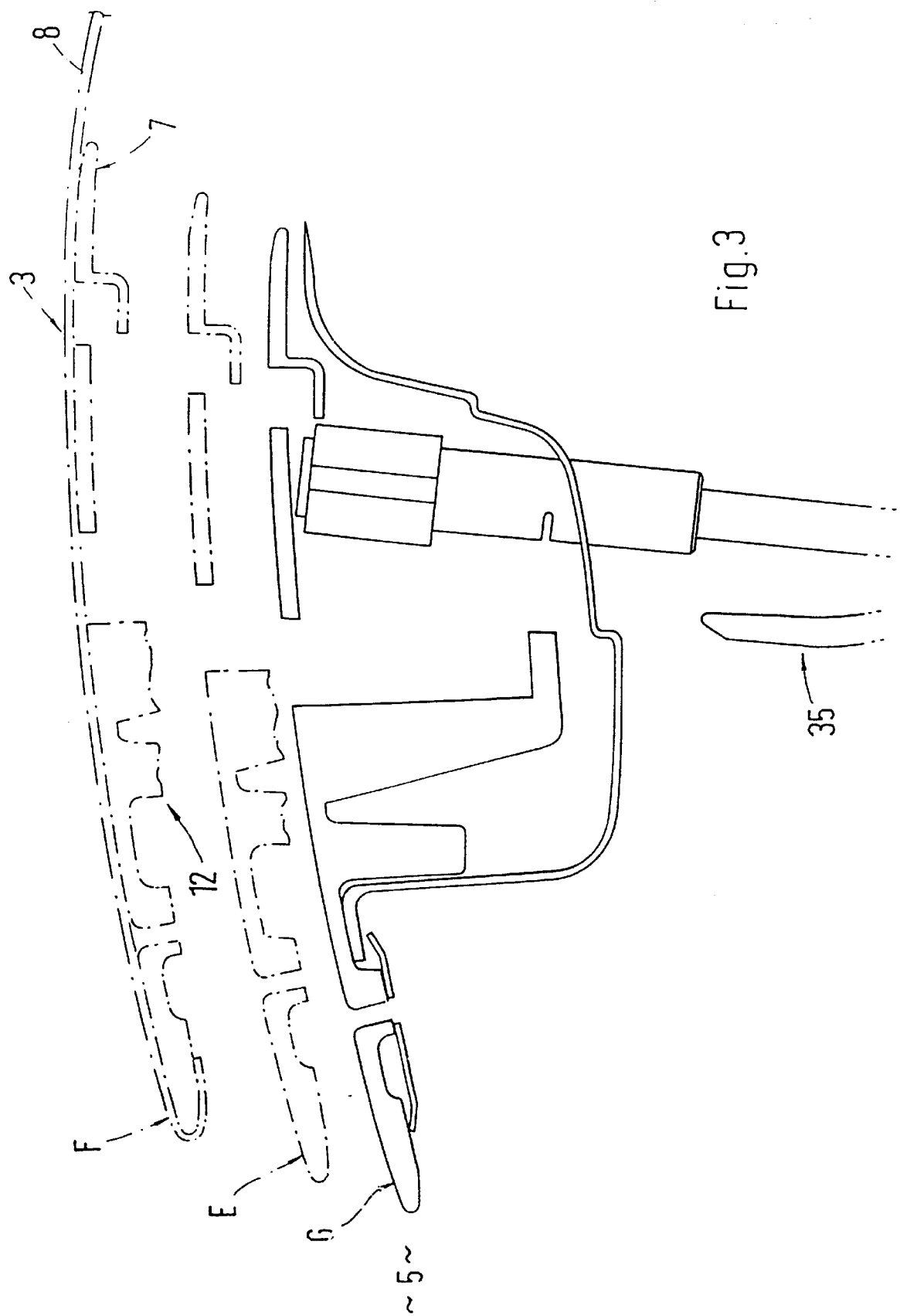
FIG. 3 shows a partial side view of the roof front end of the soft top, the closed position, the locking position lying above it and the premounted position being represented here.

FIG. 3 shows the manual actuating handle 35 for locking the roof front end. When the disc-spring assembly 23 is compressed, the disc springs are compressed so that they rest flat against one another: By this means, the slide 22 is moved forwards by a distance "a" (FIG. 5).

What is claimed is:

1. Soft top assembly for a passenger vehicle which has a passenger compartment, a windscreen frame at one side of the passenger compartment and a top receiving space at an opposite side of the passenger compartment, said soft top assembly comprising:

a soft top linkage adapted to be pivotally supported in use at the vehicle, an actuating device operable during a top closing procedure to move the soft top linkage to a top closing position from the receiving space to a locking position above the windscreen frame, said actuating device being operable to stop movement of the soft top linkage at a premounted position above the locking position, and at least one spring loaded stop operable to support the soft top linkage with respect to the vehicle in said premounted position.

2. Soft top assembly according to claim 1, wherein the at least one spring-loaded stop includes two spring-loaded stops, one on each longitudinal side of the soft top linkage.

3. Soft top assembly according to claim 2, wherein each spring loaded stop extends in use in a longitudinal direction of the vehicle, and wherein during the closing process of the soft-top linkage, an end of each stop is operatively connected to the soft-top linkage.

4. Soft top assembly according to claim 2, wherein each spring-loaded stop comprises an outer guide part, an internal displaceable slide, and a disc-spring assembly composed of disc springs.

5. Soft top assembly according to claim 2, wherein each spring loaded stop interacts with one of a main pillar of the soft-top linkage and a mounting part placed upon and belonging to the main pillar.

6. Soft top assembly according to claim 2, wherein the soft top linkage is supported in the premounted position by the at least one spring loaded stop, wherein a rear fabric-retaining hoop of the soft top linkage is pivoted downwards and is locked to a soft top receiving lid lying beneath it, and wherein subsequently a roof front end of the soft top linkage is pressed down, with the disc-spring assembly being compressed, from the premounted position into the lower-lying locking position.

7. Soft top assembly according to claim 2, wherein the actuating device includes means for stopping the actuating device once the spring-loaded stop is reached.

8. Soft top assembly according to claim 7, wherein the soft top linkage is supported in the premounted position by the at least one spring loaded stop, wherein a rear fabric-retaining hoop of the soft top linkage is pivoted downwards and is locked to a soft top receiving lid lying beneath it, and wherein subsequently a roof front end of the soft top linkage is pressed down, with the disc-spring assembly being compressed, from the premounted position into the lower-lying locking position.

9. Soft top assembly according to claim 3, wherein each spring loaded stop comprises an outer guide part, an internal displaceable slide, and a disc-spring assembly composed of disc springs.

10. Soft top assembly according to claim 9, wherein soft-top supports are provided for supporting the soft top linkage at the vehicle body, and wherein, for each spring loaded stop, the outer guide part is connected in an adjustable manner to a receiving nut provided on a respective soft-top support.

11. Soft top assembly according to claim 9, wherein, for each spring loaded stop, the displaceable slide is connected to the outer guide part via a screw at its end which faces the soft-top support.

12. Soft top assembly according to claim 9, wherein, for each spring loaded stop, the disc-spring assembly is seated coaxially on the internal slide, and is supported in a prestressed manner against a shoulder of the guide part at one end and at the other end against a collar on the end of the slide.

13. Soft top assembly according to claim 10, wherein the soft top linkage is supported in the premounted position by the at least one spring loaded stop, wherein a rear fabric-retaining hoop of the soft top linkage is pivoted downwards and is locked to a soft top receiving lid lying beneath it, and wherein subsequently a roof front end of the soft top linkage is pressed down, with the disc-spring assembly being compressed, from the premounted position into the lower-lying locking position.

14. Soft top assembly according to claim 1, wherein each spring loaded stop extends in use in a longitudinal direction of the vehicle body, and wherein during the closing process of the soft-top a rear, free end of each stop is operatively connected to the soft-top linkage.

15. Soft top assembly according to claim 14, wherein each spring-loaded stop comprises an outer guide part, an internal displaceable slide, and a disc-spring assembly composed of disc springs.

16. Soft top assembly according to claim 14, wherein each spring loaded stop interacts with one of a main pillar of the soft-top linkage and a mounting part placed upon and belonging to the main pillar.

17. Soft top assembly according to claim 14, wherein the soft top linkage is supported in the premounted position by the at least one spring loaded stop, wherein a rear fabric-retaining hoop of the soft top linkage is pivoted downwards and is locked to a soft top receiving lid lying beneath it, and wherein subsequently a roof front end of the soft top linkage is pressed down, with the disc-spring assembly being compressed, from the premounted position into the lower-lying locking position.

18. Soft top assembly according to claim 1, wherein each spring loaded stop comprises an outer guide part, an internal displaceable slide, and a disc-spring assembly composed of disc springs.

19. Soft top assembly according to claim 18, comprising soft-top supports for supporting the soft top linkage on the vehicle, wherein the outer guide part of each respective stop is connected in an adjustable manner to a respective receiving nut provided on a respective one of the soft-top supports.

20. Soft top assembly according to claim 2, wherein each spring loaded stop interacts with one of a main pillar of the soft-top linkage and a mounting part placed upon and belonging to the main pillar.

21. Soft top assembly according to claim 19, wherein the soft top linkage is supported in the premounted position by the at least one spring loaded stop, wherein a rear fabric-retaining hoop of the soft top linkage is pivoted downwards and is locked to a soft top receiving lid lying beneath it, and wherein subsequently a roof front end of the soft top linkage is pressed down, with the disc-spring assembly being compressed, from the premounted position into the lower-lying locking position.

22. Soft top assembly according to claim 19, wherein, for each spring loaded stop, the displaceable slide is connected to the outer guide part via a screw at its end which faces a respective one of the soft-top supports.

23. Soft top assembly according to claim 22, wherein each spring loaded stop interacts with one of a main pillar of the soft-top linkage and a mounting part placed upon and belonging to the main pillar.

24. Soft top assembly according to claim 1, wherein, for each spring loaded stop, the disc-spring assembly is seated coaxially on the internal dispaceable slide, and is supported in a prestressed manner against a shoulder of the outer guide part at one end and at the other end against a collar on the end of the internal displaceable slide.

25. Soft top assembly according to claim 24, wherein each spring loaded stop interacts with one of a main pillar of the soft-top linkage and a mounting part placed upon and belonging to the main pillar.

26. Soft top assembly according to claim 24, wherein the actuating device includes means for stopping the actuating device once the spring-loaded stop is reached.

27. Soft top assembly according to claim 18, wherein the soft top linkage is supported in the premounted position by the at least one spring loaded stop, wherein a rear fabric-retaining hoop of the soft top linkage is pivoted downwards and is locked to a soft top receiving lid lying beneath it, and wherein subsequently a roof front end of the soft top linkage is pressed down, with the disc-spring assembly being compressed, from the premounted position into the lower-lying locking position.

28. Soft top assembly according to claim wherein the actuating device includes means for stopping the the actuating device movement once the spring-loaded stop is reached.

29. Soft top assembly according to claim 28, wherein after the fabric-retaining hoop is locked, the actuating device is set in motion for a certain time by a timing element.

30. Soft top assembly according to claim 18, wherein soft-top supports are provided for supporting the soft top linkage at the vehicle body, and wherein, for each spring loaded stop, the outer guide part is connected in an adjustable manner to a receiving nut provided on a respective soft-top support.

31. Soft top assembly according to claim 30, wherein the soft top linkage is supported in the premounted position by the at least one spring loaded stop, wherein a rear fabric-retaining hoop of the soft top linkage is pivoted downwards and is locked to a soft top receiving lid lying beneath it, and wherein subsequently a roof front end of the soft top linkage is pressed down, with the disc-spring assembly being compressed, from the premounted position into the lower-lying locking position.

32. Soft top assembly according to claim 15, wherein each spring loaded stop interacts with one of a main pillar of the soft-top linkage and a mounting part placed upon and belonging to the main pillar.

33. Soft top assembly according to claim 1, wherein each spring loaded stop interacts with one of a main pillar of the soft-top linkage and a mounting part placed upon and belonging to the main pillar.

34. Soft top assembly according to claim 33, wherein the soft top linkage is supported in the premounted position by the at least one spring loaded stop, wherein a rear fabric-retaining hoop of the soft top linkage is pivoted downwards and is locked to a soft top receiving lid lying beneath it, and wherein subsequently a roof front end of the soft top linkage is pressed down, with the disc-spring assembly being compressed, from the premounted position into the lower-lying locking position.

35. Soft top assembly according to claim 34, wherein after a fabric-retaining hoop of said soft top linkage is locked, the actuating device is set in motion for a certain time by a timing element.

36. A soft top assembly according to claim 1, comprising a flexible soft top cover supported by the soft top linkage.

37. A soft top assembly according to claim 1, wherein said premounted position is between 15 and 35 mm above the locking position.

38. A passenger vehicle comprising:

a passenger compartment, a windscreen frame at a front end of the passenger compartment, a top receiving space behind the passenger compartment, a soft top cover operable to cover the passenger compartment when in a closed position, a soft top linkage supported at the vehicle and operably supporting the soft top cover, an actuating device operable during a top closing procedure to move the soft top linkage to a top closing position from the top receiving space to a locking position above the windscreen frame, said actuating device being operable to stop movement of the soft top linkage at a premounted position above the locking position, and at least one spring loaded stop operable to support the soft top linkage with respect to the vehicle body in said premounted position.

39. A passenger vehicle according to claim 38, wherein said at least one spring loaded stop includes two spring-loaded stops, one on each longitudinal side of the soft top linkage.

40. A passenger vehicle according to claim 38, wherein each spring loaded stop extends in the longitudinal direction of the vehicle, and wherein during the closing process of the soft top cover a rear, free end of each stop is operatively connected to the soft-top linkage.

41. A passenger vehicle according to claim 38, wherein said premounted position is between 15 and 35 mm above the locking position.

* * * * *